United States Patent
Huang

[11] Patent Number: 5,909,800
[45] Date of Patent: Jun. 8, 1999

[54] FILM ARTICLE RELEASE MACHINE

[76] Inventor: Tsai-Hsiu Huang, 58, Ma Yuan West St., Taichung, Taiwan

[21] Appl. No.: 08/969,733

[22] Filed: Nov. 13, 1997

[51] Int. Cl.$^6$ .................................................. B65G 17/18
[52] U.S. Cl. .................................... 198/803.4; 198/803.7; 198/803.12; 425/274; 425/438
[58] Field of Search ............................ 198/803.4, 803.7, 198/803.12; 425/274, 438

[56] References Cited

U.S. PATENT DOCUMENTS

| | | | |
|---|---|---|---|
| 3,655,317 | 4/1972 | Funkhouser et al. | 425/428 |
| 4,263,768 | 4/1981 | Russell et al. | 198/803.4 |
| 5,776,520 | 7/1998 | Howe et al. | 425/438 |

*Primary Examiner*—William E. Terrell
*Assistant Examiner*—Mark Deuble

[57] ABSTRACT

A film article release machine has two drive wheels, a conveyer chain surrounds the drive wheels and is driven by the drive wheels, and a plurality of release devices disposed on the conveyer chain. A guide plate is disposed above the conveyer chain. A main chain is disposed above the guide plate. A plurality of hand-shaped molds are disposed on the main chain. Each hand-shaped mold is dipped into a raw material solution such as a PVC solution. After the hand-shaped mold is dried, a film article is formed. A rolling wheel is connected to each hand-shaped mold. A brush wheel brushes the film article to roll up a portion of the film article to form a roll-up portion. Then the film article is blown by a blowing pipe to blow the roll-up portion of the film article to the original position. The release devices clamp the film articles and release the film articles from the hand-shaped molds.

3 Claims, 8 Drawing Sheets

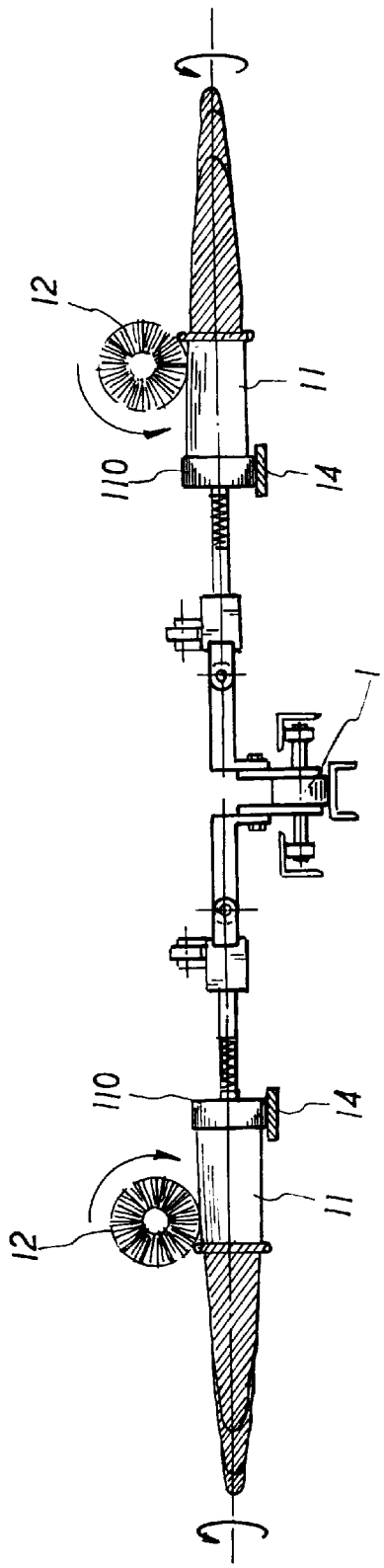
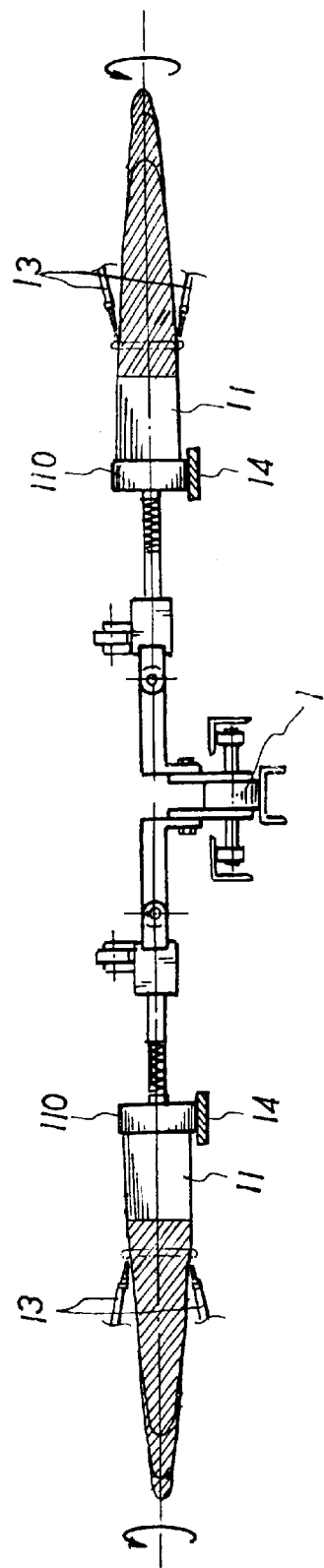
FIG. 2
FIG. 3

FILM ARTICLE RELEASE MACHINE

BACKGROUND OF THE INVENTION

The present invention relates to a film article release machine. More particularly, the present invention relates to a film article release machine which can release a plurality of film articles easily.

A conventional film article release machine comprises a very complex release device in order to release a plurality of film articles, a very complex clamp device to be driven by a screw rod, and a dirve mechanism to drive the screw rod. Since the dirve mechanism is controlled by an electric circuit, the whole structure should be very complex. It will consume a lot of electricity to rotate the heavy and complex release device. Furthermore, the film articles are released at random. Therefore, the film articles cannot be arranged in order automatically.

SUMMARY OF THE INVENTION

An object of the present invention is to provide a film article release machine which can release a plurality of film articles easily. The construction of the film article release machine is simple and easy to use and maintain. Most importantly, the film article release machine is structurally robust and reduce the operation energy consumption.

Another object of the present invention is to provide a film article release machine which can release a plurality of film articles in order so that the film articles can be overlapped in order automatically. It further provides the feature for successive automatic packing operation.

Accordingly, a film article release machine comprises two drive wheels, a conveyer chain surrounds the drive wheels and is driven by the drive wheels, and a plurality of release devices disposed on the conveyer chain. Four parallel guide plates are disposed above the conveyer chain. Each of the release devices has a positioning seat connected to the conveyer chain. A first and a second distal sleeves are disposed on the positioning seat. A third and a fourth distal sleeves are disposed on the positioning seat. A first and a second middle sleeves are disposed on the positioning seat. The first middle sleeve is disposed between the first and the second distal sleeves. The second middle sleeve is disposed between the third and the fourth distal sleeves. A first swivel arm is disposed on the first middle sleeve. A second swivel arm is disposed on the second middle sleeve. A first support post is disposed on the positioning seat. A first adjustment bolt passes through the first support post and abuts against the first swivel arm. A second adjustment bolt passes through the second support post and abuts against the second swivel arm. A first adjustment screw is disposed on the first swivel arm. A second adjustment screw is disposed on the second swivel arm. A compression spring is disposed between the first adjustment screw and the second adjustment screw. A first upper clip and a first lower clip are disposed on an upper portion of the first swivel arm. A first guide wheel is connected to the first upper clip. A second upper clip and a second lower clip are disposed on an upper portion of the second swivel arm. A second guide wheel is connected to the second upper clip. A first pivot seat is disposed on a middle portion of the first swivel arm. A first adjustment stud is disposed on the first pivot seat. A first coiled spring is disposed between the first upper clip and the first pivot seat. A second pivot seat is disposed on a middle portion of the second swivel arm. A second adjustment stud is disposed on the second pivot seat. A second coiled spring is disposed between the second upper clip and the second pivot seat. A first guide roller is disposed on an upper end of the first swivel arm. A second guide roller is disposed on an upper end of the second swivel arm. The first guide roller and the second guide roller slide between two of the corresponding guide plates. Each of the guide plates has a curved portion. A directional plate is disposed on the curved portion of the guide plate. The directional plate has two bottom distal bevels. A main chain is disposed above the guide plate. A plurality of hand-shaped molds are disposed on the main chain. Each hand-shaped mold is dipped into a raw material solution such as a PVC solution. After the hand-shaped mold is dried, a film article is formed. Thus the film article encloses the hand-shaped mold. Then the hand-shaped mold is sent to an area A. The main chain moves parallel to a support plate and a lead plate. A rolling wheel is connected to each hand-shaped mold and rotates along the support plate and the lead plate. In the area A, a brush wheel brushes the film article in order to roll up a portion of the film article to form a roll-up portion. When the hand-shaped mold is sent to an area B, the film article is blown by a high pressure blowing pipe in order to blow the roll-up portion of the film article to the original position. Therefore, the roll-up portion of the film article is separated from the hand-shaped mold. The positioning rod is disposed behind the lead plate. An end of the positioning rod is disposed beneath an end of the lead plate. A block bar is disposed on the rolling wheel. When the rolling wheel rotates from the lead plate to the positioning rod, the block bar will contact the positioning rod. Therefore, the rolling wheel will not rotate. The first and the second swivel arms can swivel according to the distance between two of the corresponding guide plates. Since the first guide roller and the second guide roller slide between two of the corresponding guide plates, the first and the second swivel arms swivel outward. The first and the second swivel arms and the hand-shaped mold with the film article thereon are sent to the curved portions of two corresponding guide plates simultaneously. Since the distance between two corresponding guide plates are narrowed, the first and the second swivel arms swivel inward. The first guide wheel and the second guide wheel are directed and pressed by the corresponding directional plates respectively. The first upper clip and the second upper clip will rotate upward. At the same time, the film article is blown by a high pressure blowing tube in order to roll up a portion of the film article to form a roll-up portion to cover the distal ends of the first lower clip and the second lower clip. Then the first guide wheel and the second guide wheel leave the corresponding directional plates respectively. Then the first upper clip and the first lower clip clamp the roll-up portion of the film article, and the second upper clip and the second lower clip clamp the roll-up portion of the film article also.

BRIEF DESCRIPTION OF THE DRAWINGS

FIG. 2 is a schematic view illustrating a film article is rolled up by a brush wheel;

FIG. 3 is a schematic view illustrating a roll-up portion of a film article is blown by a high pressure blowing pipe;

DETAILED DESCRIPTION OF THE INVENTION

Figure 1:
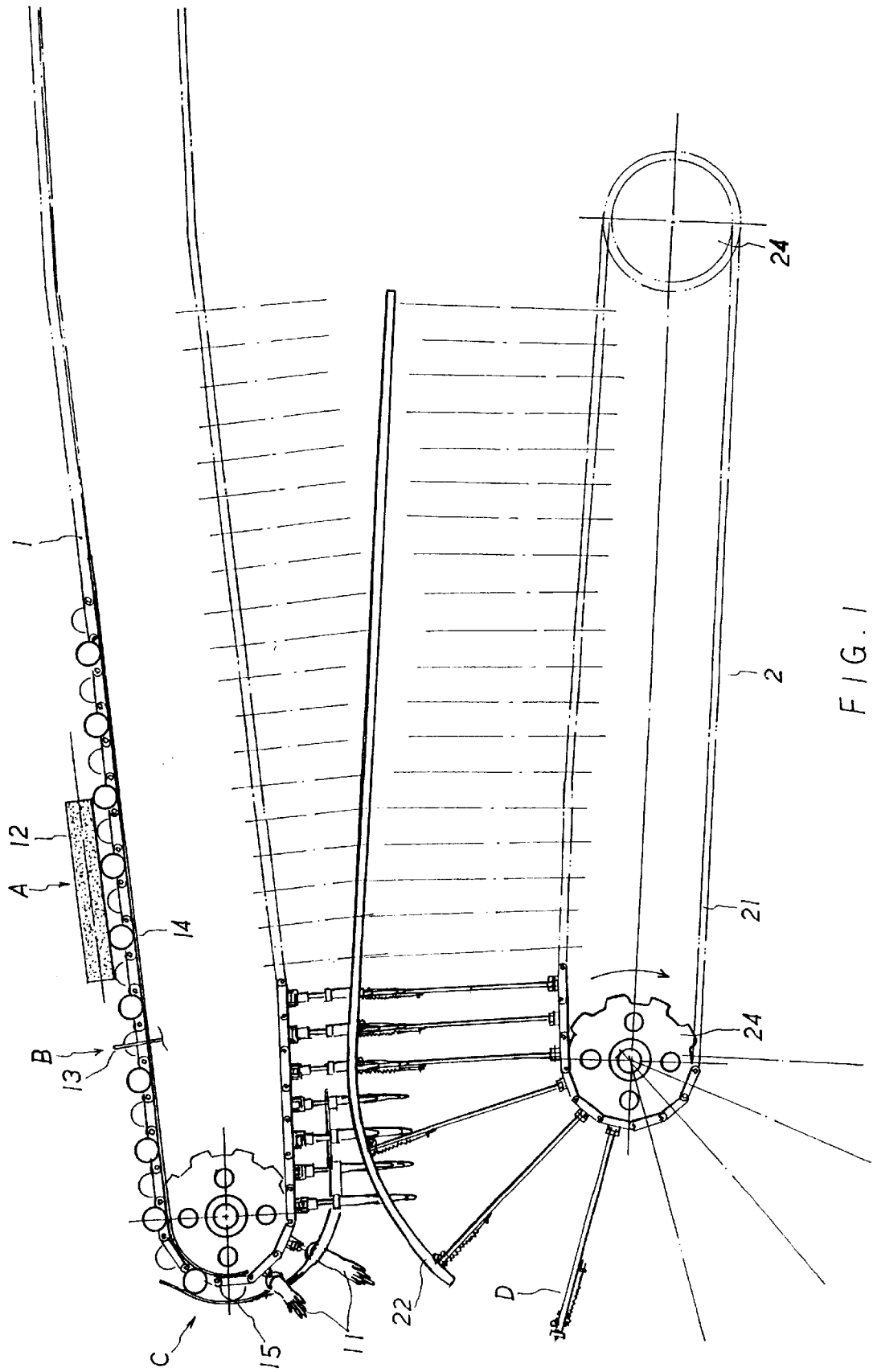
FIG. 1 is a schematic elevational view of a film article release machine of a preferred embodiment in accordance with the present invention.

Referring to FIGS. 1 to 5, a film article release machine 2 comprises two drive wheels 24, a conveyer chain 21 surrounds the drive wheels 24 and is driven by the drive wheels 24, and a plurality of release devices D disposed on the conveyer chain 21. Four parallel guide plates 22 are disposed above the conveyer chain 21. Each release devices D has a positioning seat 31 connected to the conveyer chain 21. A first and a second distal sleeves 321 are disposed on the positioning seat 31. A third and a fourth distal sleeves 321 are disposed on the positioning seat 31. A first and a second middle sleeves 321 are disposed on the positioning seat 31. The first middle sleeve 321 is disposed between the first and the second distal sleeves 321. The second middle sleeve 321 is disposed between the third and the fourth distal sleeves 321. A first swivel arm 32 is disposed on the first middle sleeve 321. A second swivel arm 32 is disposed on the second middle sleeve 321. A first support post 30 is disposed on the positioning seat 31. A first adjustment bolt 301 passes through the first support post 30 and abuts against the first swivel arm 32. A second adjustment bolt 301 passes through the second support post 30 and abuts against the second swivel arm 32. A first adjustment screw 302 is disposed on the first swivel arm 32. A second adjustment screw 302 is disposed on the second swivel arm 32. A compression spring 303 is disposed between the first adjustment screw 302 and the second adjustment screw 302. A first upper clip 34 and a first lower clip 33 are disposed on an upper portion of the first swivel arm 32. A first guide wheel 35 is connected to the first upper clip 34. A second upper clip 34 and a second lower clip 33 are disposed on an upper portion of the second swivel arm 32. A second guide wheel 35 is connected to the second upper clip 34. A first pivot seat 37 is disposed on a middle portion of the first swivel arm 32. A first adjustment stud 38 is disposed on the first pivot seat 37. A first coiled spring 39 is disposed between the first upper clip 34 and the first pivot seat 37. A second pivot seat 37 is disposed on a middle portion of the second swivel arm 32. A second adjustment stud 38 is disposed on the second pivot seat 37. A second coiled spring 39 is disposed between the second upper clip 34 and the second pivot seat 37. A first guide roller 36 is disposed on an upper end of the first swivel arm 32. A second guide roller 36 is disposed on an upper end of the second swivel arm 32. The first guide roller 36 and the second guide roller 36 slide between two of the corresponding guide plates 22. Each of the guide plates 22 has a curved portion 221. A directional plate 23 is disposed on the curved portion 221 of the guide plate 22. The directional plate 23 has two bottom distal bevels 232. A first and a second opposite lateral sleeves 341 position the first upper clip 34 on the first swivel arm 32. A third and a fourth opposite lateral sleeves 341 position the second upper clip 34 on the second swivel arm 32.

A main chain 1 is disposed above the guide plate 22. A plurality of hand-shaped molds 11 are disposed on the main chain 1. Each hand-shaped mold 11 is dipped into a raw material solution such as a PVC solution. After the hand-shaped mold 11 is dried, a film article is formed. Thus the film article encloses the hand-shaped mold 11. Then the hand-shaped mold 11 is sent to an area A.

Figure 8:
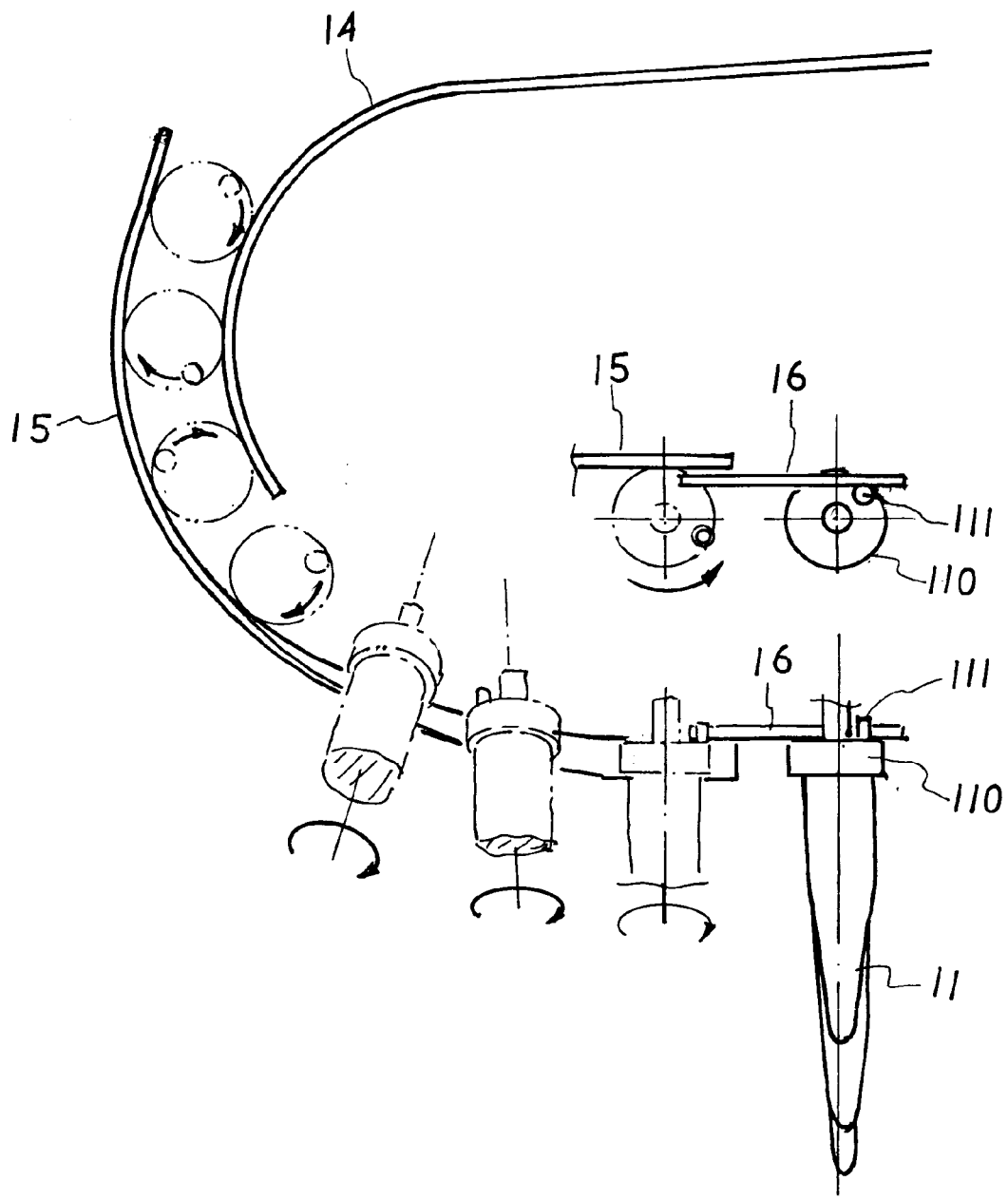
FIG. 8 is a schematic view illustrating a hand-shaped mold is rotated and finally fixed on a preset position.

Referring to FIGS. 1, 2 and 8, the main chain 1 moves parallel to a support plate 14 and a lead plate 15. At least a rolling wheel 110 is connected to the hand-shaped mold 11 and rotates along the support plate 14 and the lead plate 15. In the area A, a brush wheel 12 brushes the film article in order to roll up a portion of the film article to form a roll-up portion. When the hand-shaped mold 11 is sent to an area B, the film article is blown by a high pressure blowing pipe 13 in order to blow the roll-up portion of the film article to the original position. Therefore, the roll-up portion of the film article is separated from the hand-shaped mold 11.

Figure 9:
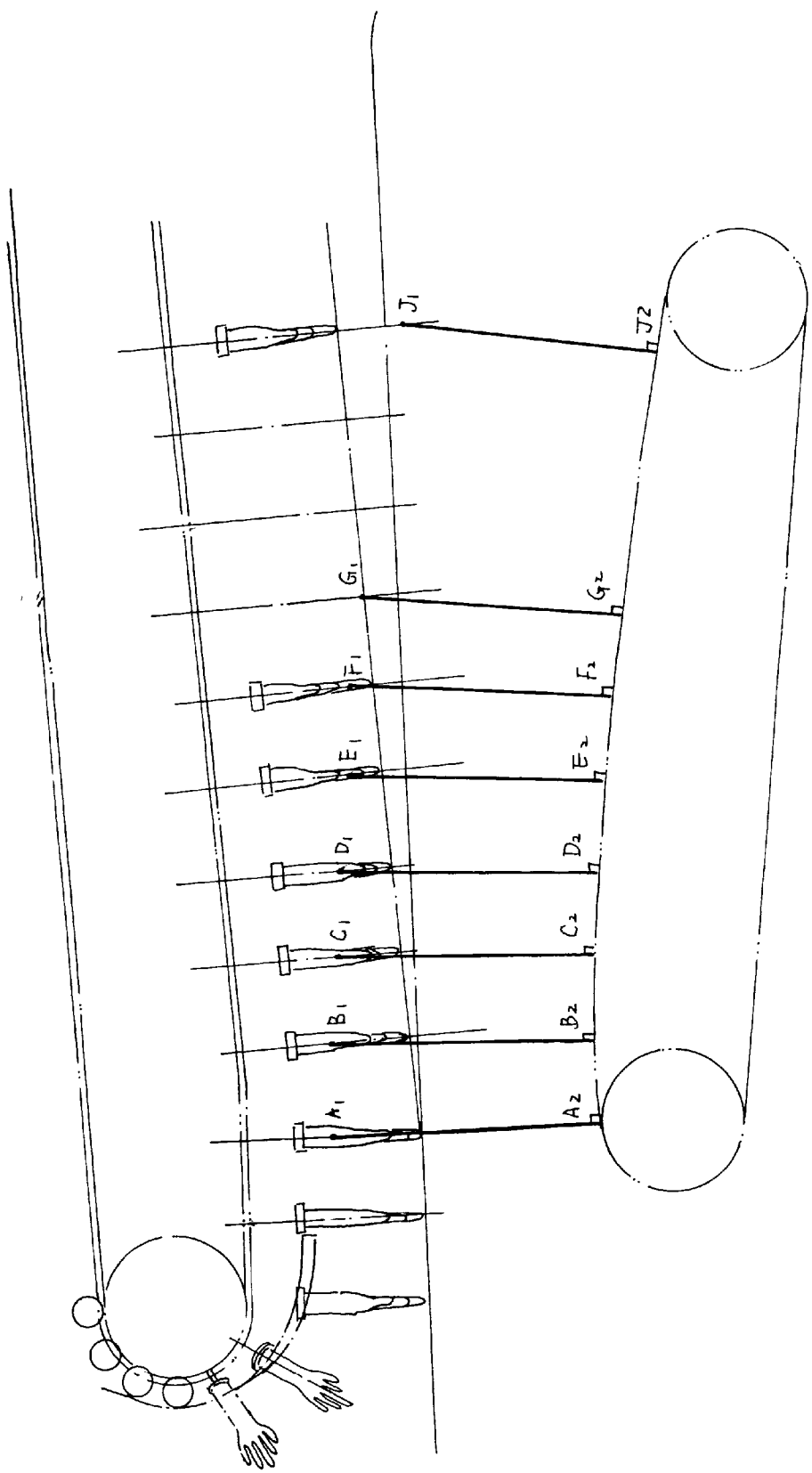
FIG. 9 is a schematic view illustrating a plurality of film articles are released.

Referring to FIGS. 8 and 9, a positioning rod 16 is disposed behind the lead plate 15. An end of the positioning rod 16 is disposed beneath an end of the lead plate 15. A block bar 111 is disposed on the rolling wheel 110. When the rolling wheel 110 rotates from the lead plate 15 to the positioning rod 16, the block bar 111 will contact the positioning rod 16. Therefore, the rolling wheel 110 will not rotate.

Figure 4:
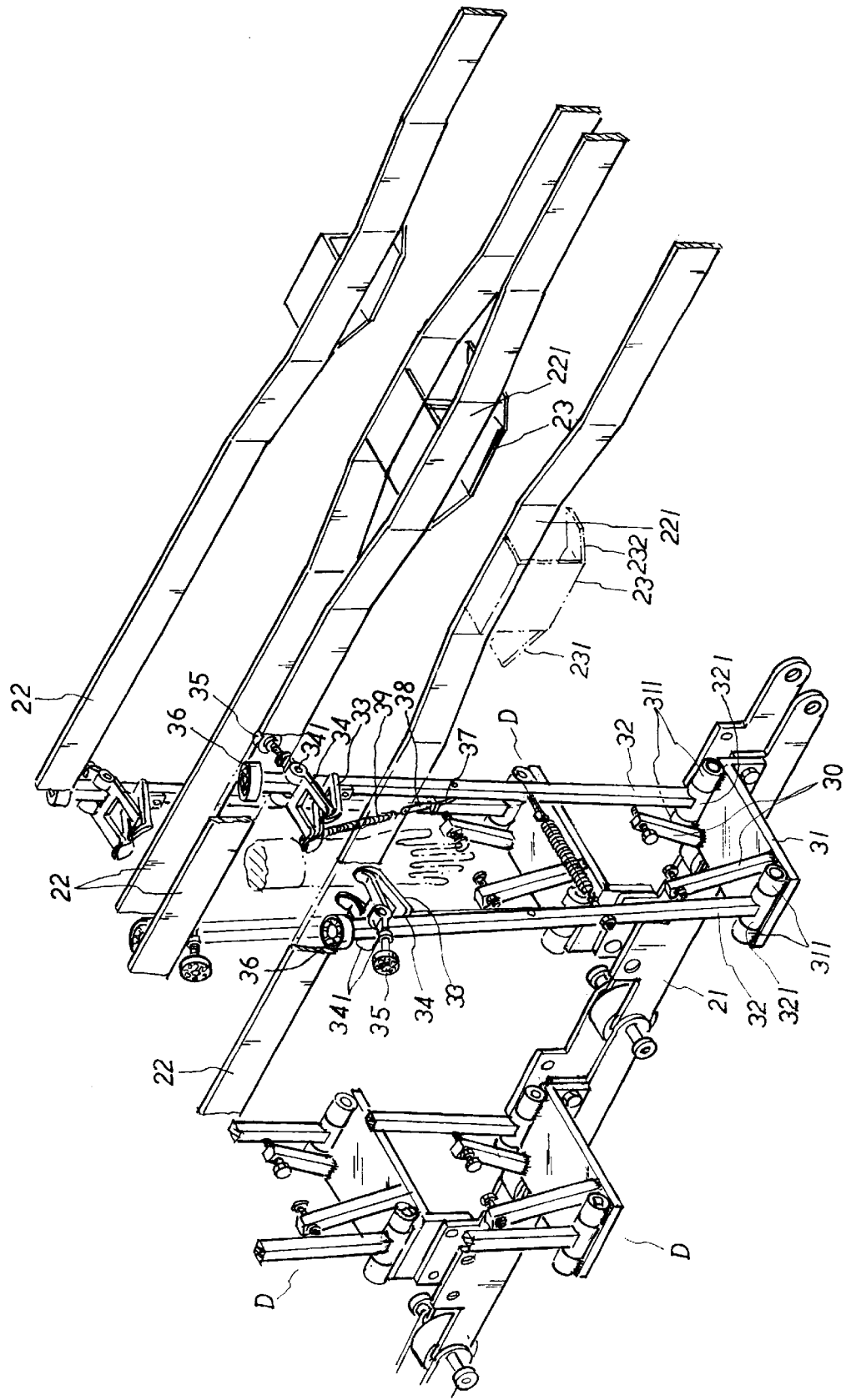
FIG. 4 is a partially perspective exploded view of a release device.
Figure 5:
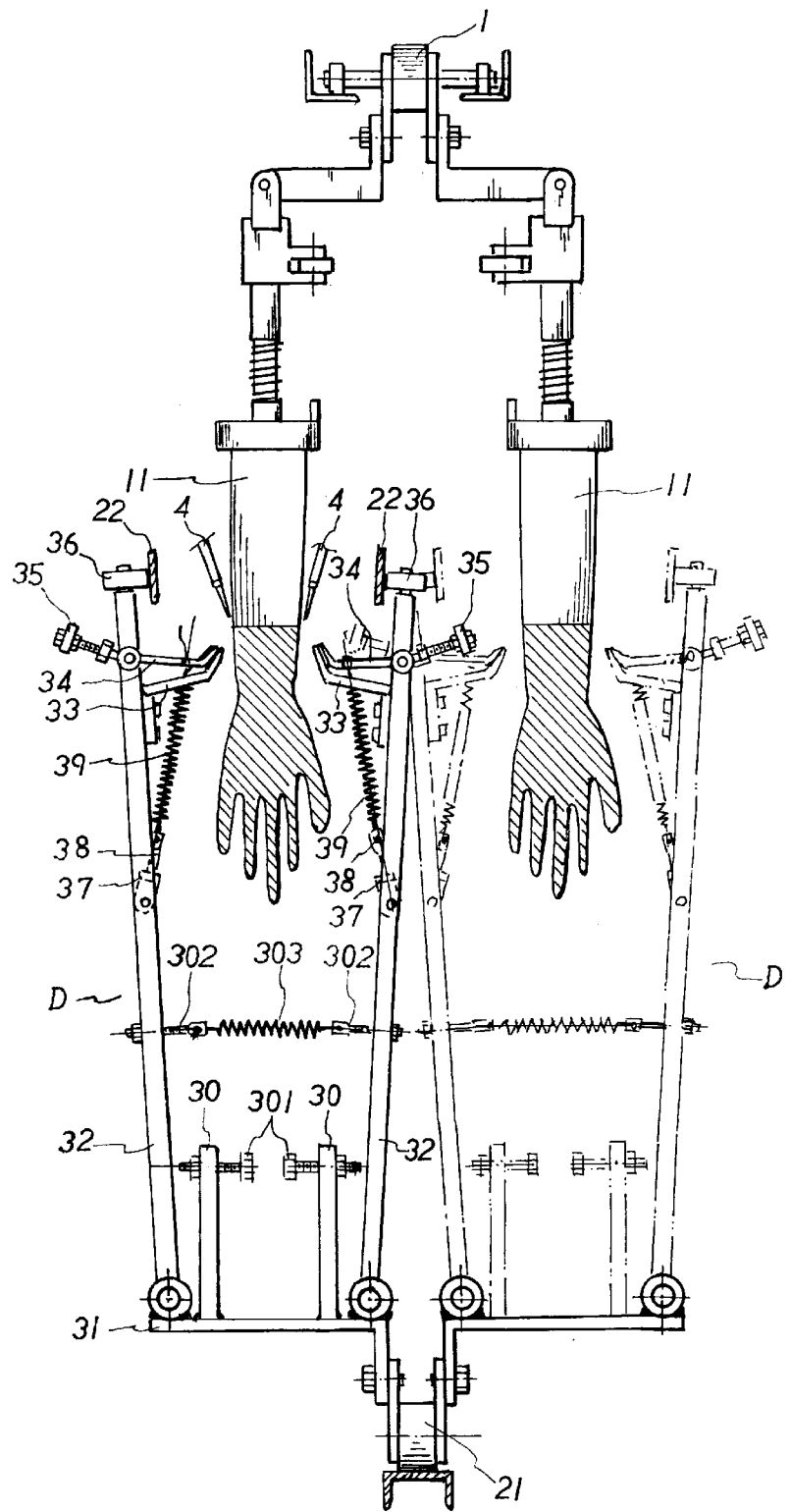
FIG. 5 is a schematic view illustrating a film article is not clamped.
Figure 6:
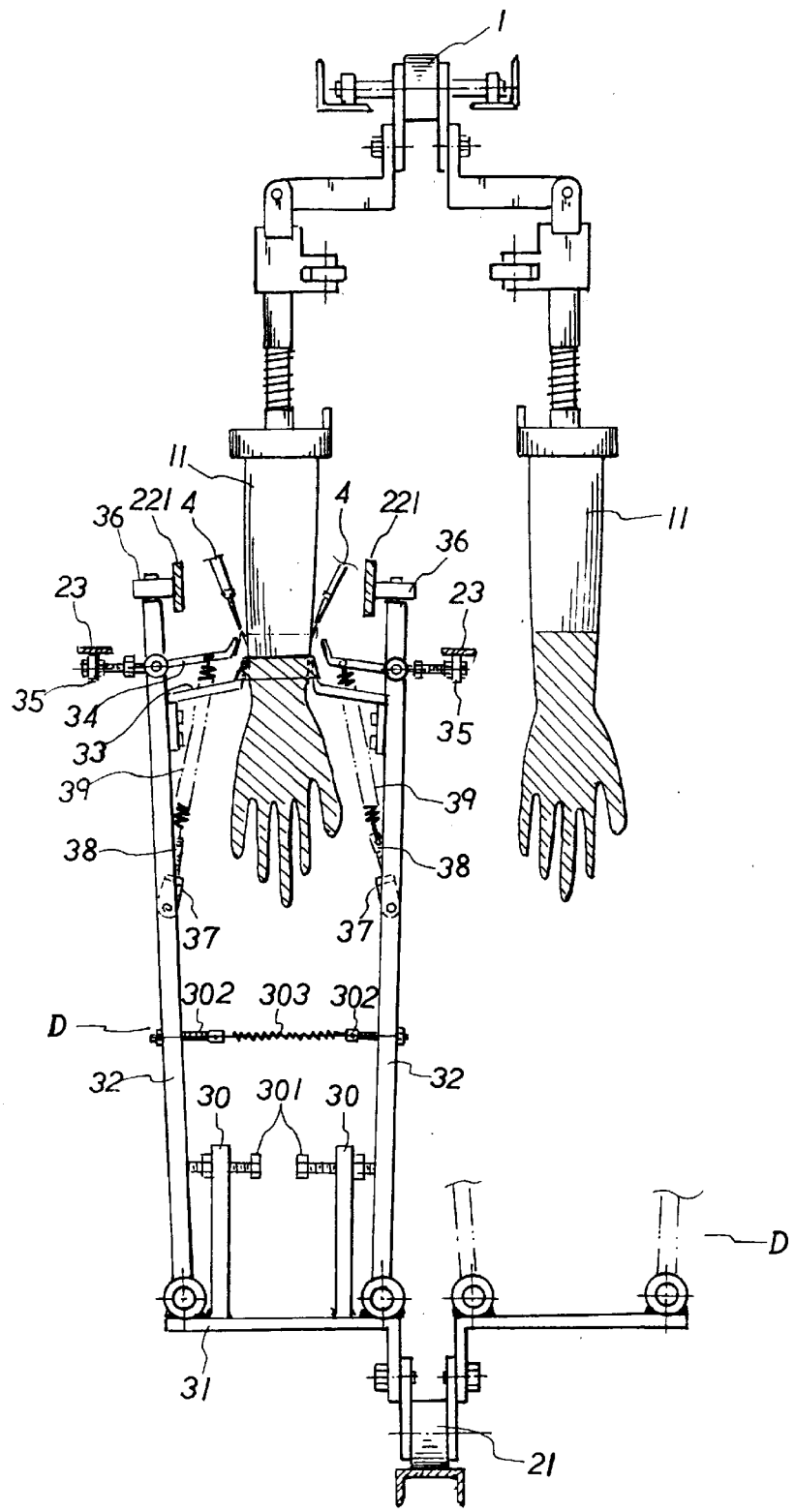
FIG. 6 is a schematic view illustrating a film article is clamped.
Figure 7:
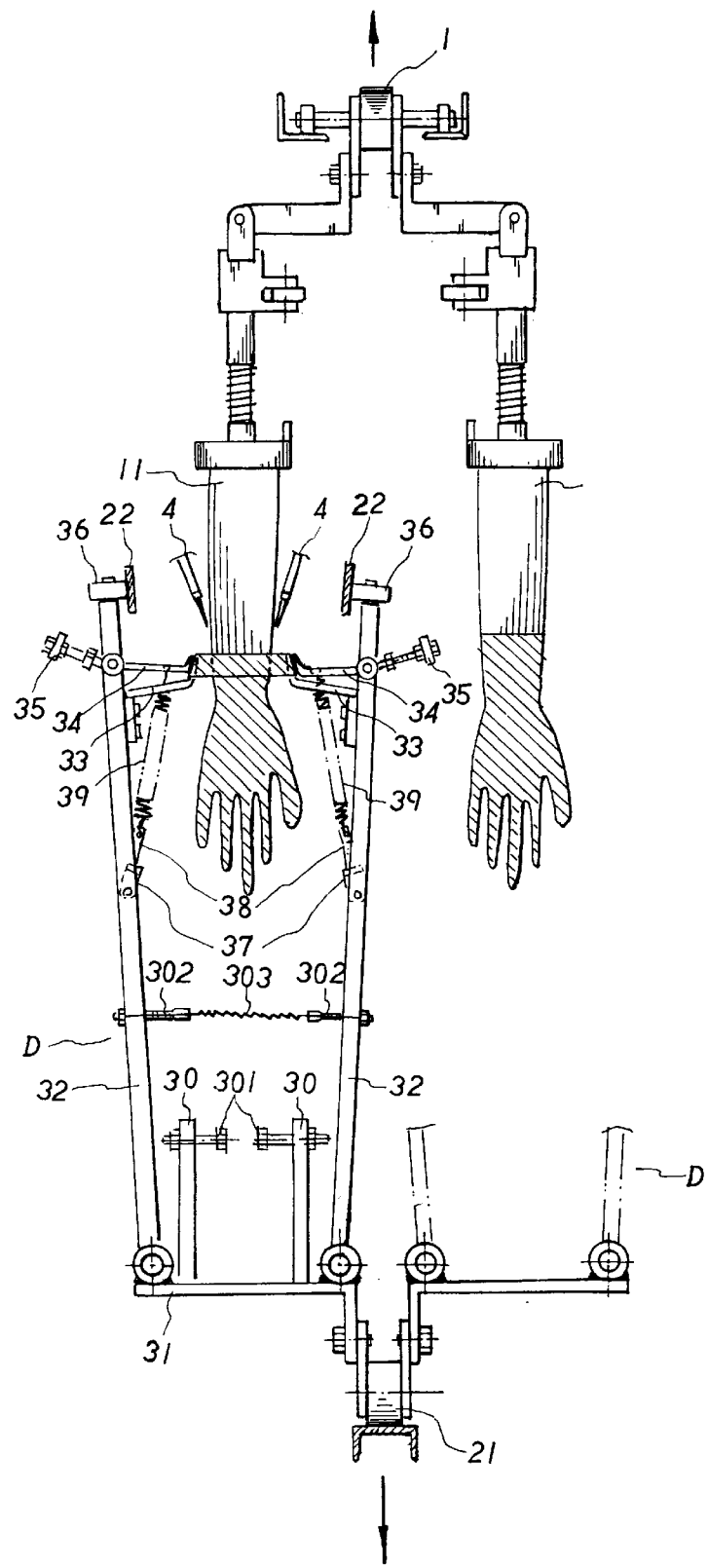
FIG. 7 is a schematic view illustrating a film article is released from a hand-shaped mold.

Referring to FIGS. 4 to 7, the first and the second swivel arms 32 can swivel according to the distance between two of the corresponding guide plates 22. Since the first guide roller 36 and the second guide roller 36 slide between two of the corresponding guide plates 22, the first and the second swivel arms 32 swivel outward. Referring to FIGS. 4 and 6, the first and the second swivel arms 32 and the hand-shaped mold 11 with the film article thereon are sent to the curved portions 221 of two corresponding guide plates 22 simultaneously. Since the distance between two corresponding guide plates 22 are narrowed, the first and the second swivel arms 32 swivel inward. The first guide wheel 35 and the second guide wheel 35 are directed and pressed by the corresponding directional plates 23 respectively. The first upper clip 34 and the second upper clip 34 will rotate upward. At the same time, the film article is blown by a high pressure blowing tube 4 in order to roll up a portion of the film article to form a roll-up portion to cover the distal ends of the first lower clip 33 and the second lower clip 33. Then the first guide wheel 35 and the second guide wheel 35 leave the corresponding directional plates 23 respectively. Then the first upper clip 34 and the first lower clip 33 clamp the roll-up portion of the film article, and the second upper clip 34 and the second lower clip 33 clamp the roll-up portion of the film article also.

The present invention is not limited to the above embodiment but various modification thereof may be made. Furthermore, various changes in form and detail may be made without departing from the scope of the present invention.

I claim:

1. A film article release machine comprises:

two drive wheels, a conveyer chain surrounding the drive wheels and driven by the drive wheels, a plurality of release devices disposed on the conveyer chain, four parallel guide plate disposed above the conveyer chain, each of the release devices having a positioning seat connected to the conveyer chain, a first and a second distal sleeves disposed on the positioning seat, a third and a fourth distal sleeves disposed on the positioning seat, a first and a second middle sleeves disposed on the positioning seat, the first middle sleeve disposed between the first and the second distal sleeves, the second middle sleeve disposed between the third and the fourth distal sleeves, a first swivel arm disposed on the first middle sleeve, a second swivel arm disposed on the second middle sleeve, a first support post disposed on the positioning seat, a first adjustment bolt passing through the first support post and abutting against the first swivel arm, a second adjustment bolt passing through the second support post and abutting against the second swivel arm, a first adjustment screw disposed on the first swivel arm, a second adjustment screw disposed on the second swivel arm, a compression spring disposed between the first adjustment screw and the second adjustment screw, a first upper clip and a first lower clip disposed on an upper portion of the first swivel arm, a first guide wheel connected to the first upper clip, a second upper clip and a second lower clip disposed on an upper portion of the second swivel arm, a second guide wheel connected to the second upper clip, a first pivot seat disposed on a middle portion of the first swivel arm, a first adjustment stud disposed on the first pivot seat, a first coiled spring disposed between the first upper clip and the first pivot seat, a second pivot seat disposed on a middle portion of the second swivel arm, a second adjustment stud disposed on the second pivot seat, a second coiled spring disposed between the second upper clip and the second pivot seat, a first guide roller disposed on an upper end of the first swivel arm, a second guide roller disposed on an upper end of the second swivel arm, and the first guide roller and the second guide roller sliding between two of the corresponding guide plates.

2. A film article release machine as claimed in claim 1, wherein each of the guide plates has a curved portion, a directional plate is disposed on the curved portion of the guide plate, and the directional plate has two bottom distal bevels.

3. A film article release machine as claimed in claim 1, wherein a first and a second opposite lateral sleeves position the first upper clip on the first swivel arm, and a third and a fourth opposite lateral sleeves position the second upper clip on the second swivel arm.

\* \* \* \* \*